United States Patent [19]
Mealey et al.

[11] Patent Number: 5,745,763
[45] Date of Patent: Apr. 28, 1998

[54] METHOD AND APPARATUS FOR DEVICE DRIVER FUNNELLING

[75] Inventors: Bruce Gerard Mealey; Jeffrey Scott Peek; Mark Douglass Rogers, all of Austin; Randal Craig Swanberg, Round Rock; Michael Stephen Williams, Austin, all of Tex.

[73] Assignee: International Business Machines Corporation, Armonk, N.Y.

[21] Appl. No.: 536,879

[22] Filed: Sep. 29, 1995

[51] Int. Cl.[6] .................................................. G06F 15/16
[52] U.S. Cl. ........................................... 395/681; 395/733
[58] Field of Search ...................................... 395/500, 681, 395/733; 364/229.5, 230

[56] References Cited

U.S. PATENT DOCUMENTS

| | | |
|---|---|---|
| 4,821,170 | 4/1989 | Bernick et al. |
| 4,972,368 | 11/1990 | O'Brien et al. |
| 5,226,040 | 7/1993 | Noble, III et al. |
| 5,291,585 | 3/1994 | Sato et al. |

OTHER PUBLICATIONS

Norwood et al, "Symmetric Multi Processing for PCs", Dr. Dobb's Journal, Jan. 94.
Asche Ruediger, "The Little Device Drives Writer", Microsoft Technical Article, 25 Feb. 1994 pp. 1-26.
Keating, Craig, "A Fearful Symmetry", Byte, May 1990, v15 n5 pp. 221-228 (5 pages).
Nudelman, Mark "Symmtery, Thy Name is UNIX", Byte, Jun. 91 v16 n6, pp. 245-253.

*Primary Examiner*—Alvin E. Oberley
*Assistant Examiner*—Patricia G. Caldwell
*Attorney, Agent, or Firm*—David A. Mims, Jr.

[57] ABSTRACT

A method and apparatus for enabling AIX device driver (DD) created for a uniprocessor (UP) system to run unchanged on a symmetrical multiprocessor system (SMP). Device drivers are processed by a funnelling mechanism so that UP device drivers always runs on a "Master" processor in a multi-processor system. New device drivers written for the SMP system are permitted to bypass the funneling mechanism and proceed directly to execution on any available processor in the SMP system. Device registration services are provided which examine DD flags looking for a new unique flag indicating that the device driver is SMP enabled. If the flag is not present, then emulating a uniprocessor environment for execution of that device driver.

12 Claims, 6 Drawing Sheets

METHOD AND APPARATUS FOR DEVICE DRIVER FUNNELLING

FIELD OF THE INVENTION

The present invention relates to data processing systems, and more particularly, to device driver code execution that enables existing device drivers created for execution on a uniprocessor platform to run unchanged on symmetrical multi-processor platform.

BACKGROUND OF THE INVENTION

Multi-processing and multitasking were originally developed in the mainframe world. Today, operating systems use various models of the IBM Virtual Machine (VM) architecture to implement the concept. A preemptive multitasking operating system such as AIX, which is manufactured by the IBM Corporation, allocates memory partitions to create virtual machines for each running application, and then divides the Central Processing Unit (CPU) clock into time slices (or time-ticks) so that each application receives CPU time on a round-robin basis. Preemptive means that applications shifted to the background remain active to do such things as sort databases, print files, or exchange data with other computers, while a user works on a foreground application.

Multi-processing performs the same functions, except that applications and processes are time-sliced across more than one microprocessor. The process becomes a bit more complicated because the operating system kernel has to create memory locks down at the hardware level, and it must allow the operating system kernel to run across all CPUs. The operating system kernel accomplishes this by spinning off portions of itself to all the CPUs and managing the allocation of system resources to applications as they are needed.

Multi-processing can be implemented in two ways—as symmetrical multi-processing (SMP) and asymmetrical multi-processing (ASMP). SMP is the implementation of choice for many of today's server technologies. SMP balances the workload dynamically across all CPUs in a round-robin fashion at each tick of the clock cycle. If the activity on one of the processors decreases, it automatically takes over excess threads running on other processors. Priority levels can be established for each application. For instance, if a payroll application has to run every Friday morning, it could be designated to have the highest priority level. That means it will receive the lion's share of CPU time.

Major work has been required to enable AIX to run on SMP systems, particularly in the area of device drivers which are operating system kernel extensions. Device drivers enable devices to interact with the operating system kernel in the appropriate manner. AIX provides a mechanism for dynamically adding, removing or querying device driver entries in the form of a dynamically managed device switch table. The dynamic device driver switch table enables the addition or removal of device drivers without requiring the operating kernel being rebuilt or the system rebooted. Traditionally, UNIX operating systems have provided statically built-in device drivers. A devswadd service is provided in AIX to allow a device driver's configuration routine, the capability to add the device driver to the device driver switch table. A devswdel service is provided to allow a device driver's termination routine to remove its entry from the device driver switch table prior to the device driver being unloaded from the kernel. A devswqry service is provided to query entries in the device driver switch table. This service returns the state of the device switch table entry for a given major number. An internal devsw_init kernel function is provided to initialize the dynamic device switch table during operating system kernel initialization Similarly, device drivers register interrupt handlers and other interfaces to the operating system kernel.

While the dynamic device driver switch table and other facilities have eliminated the need to reboot or rebuild the operating system kernel in multitasking system using a single processor or uni-processor system, it does not enable using device drivers built for uniprocessor systems to be used on SMP systems. Existing uniprocessor device drivers must be converted to SMP device drivers, with the associated cost and aggravations of having to convert all existing uniprocessor device drivers for SMP system operation.

It is desirable to have an improved method and apparatus for enabling device drivers created for a uniprocessor system to be used unconverted on a symmetrical multi-processing system.

SUMMARY OF THE INVENTION

This invention relates to a method and apparatus for enabling AIX device driver created for a uniprocessor (UP) to run unchanged on a symmetrical multiprocessor system (SMP). AIX device drivers are operating system kernel extensions that are dynamically loaded to allow devices (e.g., printers, hard disks, floppy disks, etc.) to interact with the operating system kernel in the appropriate manner. This invention provides for the "funnelling" of all device driver code execution so that uniprocessor device drivers always run on the "Master" processor. Uniprocessor device drivers are placed in the SMP system without undergoing multiprocessor (MP) serialization. New device drivers written for the SMP system are permitted to bypass the funneling mechanism and take advantage of multiple processors on the SMP system. A device registration service is provided to the operating system kernel. Flags are defined for each device driver enabling the determination of whether the device driver is a newly created SMP device driver or one of the existing uniprocessor device driver. Operating system services detect new SMP device drivers or existing uniprocessor device drivers. The UP device drivers are moved to the master processor for subsequent execution. This allows UP device drivers to be preserved and moved directly to the SMP system, while SMP device drivers bypass the funneling mechanism and proceeds directly for multi-processor safe (MP Safe) execution on the SMP systems.

DETAILED DESCRIPTION OF THE EMBODIMENTS

This invention provides a method and apparatus for enabling device drivers created for a uniprocessor platform to be executed on a multiprocessor platform. Device Drivers (DD) are necessary to enable devices to interact with the operating system kernel in the appropriate manner. In the preferred embodiment, which uses the AIX operating system kernel, device drivers are extensions of the operating system kernel and are dynamically loaded to extend the capabilities of the operating system kernel. When the need arose to enhance the AIX operating system, by allowing execution on symmetrical multi-processing (SMP) systems, significant work was necessary to extend the operating system capabilities. The problem was how to use the large numbers of existing device drivers created for uniprocessor (UP) systems. This invention allows the preservation of customer investments in existing UP device drivers by minimizing device driver porting, and at the same time enabling the introduction of new SMP device drivers. The invention will be described more completely in reference to the following drawings.

Figure 1:
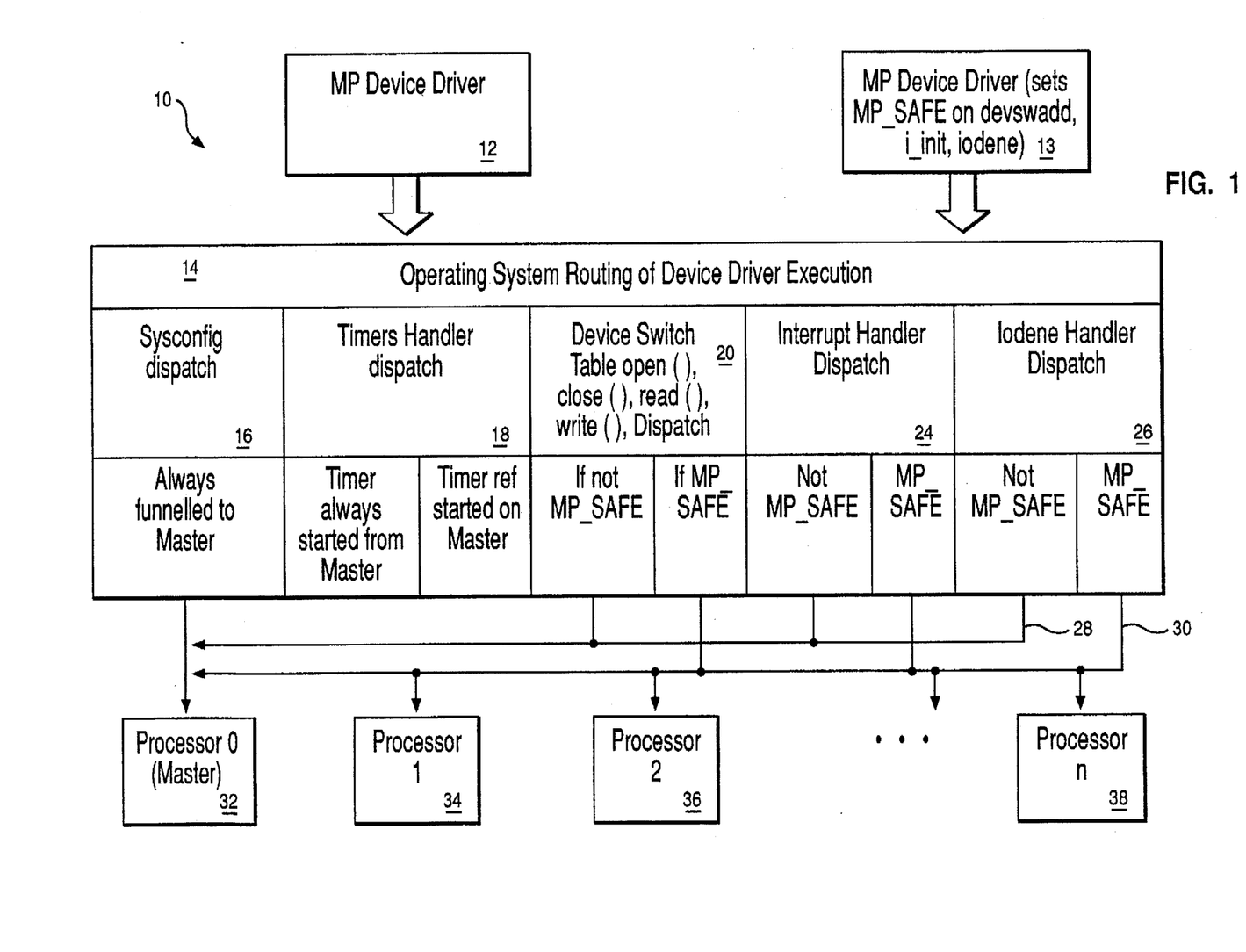
FIG. 1 is a block diagram of an operating system illustrating multiprocessor and uniprocessor device drivers on a multiprocessor platform.

Turning to FIG. 1, there is shown a block diagram of the invention in an SMP system 10. The SMP system 10 has an operating system kernel 14 for routing device driver execution to any one of N available processors 32-38. Processor 0 (32) is the master processor in a chain of N possible processors available for executing instructions in the SMP system. One skilled in the art appreciates that the operating system picks one of the "N" possible processors as the master, and ensures that all funnelled code run on that processor. This ensures that there will never be multi-processing (MP) unsafe code running on more than one processor. Uniprocessor device drivers 12, and multi-processor device drivers 13, are available to the operating system kernel 14 for routing to processors 32-38. The system configuration (sys config) dispatch 16 procedure always funnel device driver execution via line 28 to processor 0 (32) which is the master processor. The sys config dispatch 16 procedure is invoked when a device driver is being loaded and initialized. Device driver switch table 20, provides for device driver execution exclusively on master processor 0 (32) via line 28, or any available processor 0-N (32-38) via line 30. Device driver switch table 20 determines if the device driver executes on the master processor (32), by examining a flag, as associated with the device driver. If the device driver flag indicates that the device driver is multi-processor safe (MP_SAFE), execution on the device driver occurs on any available processor 32-38 via line 30. Table A gives an example of the types of flags contemplated by this invention. As disclosed in Table A, column 1 gives the DEVSW location of the available device drivers. Column 2 describes the device type, such as NVRAM, SCSI, Floppy Diskette or Ethernet Adapter. Column 3 illustrates the DEVSW flags which are MP safe for the SCSI and Ethernet Adapter and not MP safe for NVRAM and Floppy Diskette. Column 4 shows the presence or absence of interrupt flags for each device driver. Finally, Column 5 illustrates the buffer flags on a sample read. The presence of an MP_SAFE flag in this column indicates that the device driver can be executed on any one of "N" processor. Likewise, the absence of the MP_SAFE indicates that device driver execution is possible only on the master processor 32.

Returning to FIG. 1, if a device driver is determined to be NOT multi-processor safe (NOT MP_SAFE), execution is routed to the Master processor 32 via line 28. The interrupt handler dispatch 24 provides device driver dispatch in response to device interrupts. The interrupt handler dispatch 24 determines if the requested device driver is MP-safe and routes it to any available processor 32-38 for execution. Device drivers determined to be NOT MP_SAFE are funneled to the Master processor 32 for execution. If a device driver wishes to initiate an I/O request to be processed by another device driver, it invokes the "strategy" devsw entry point of the desired device driver. The calling device driver provides an "IODONE()" function address to be called when the I/O request is completed. This informs the initiator when the request is complete. For a uni-processor device driver, the invocation of the IODONE() function must be performed on the Master processor 32. A new flag "B_MPSAFE" is added so the initiator of an I/O request can indicate that initiator is MP Safe, and that the IODONE() function can be executed on any processor. Absence of the flag implies that the initiator's IODONE() function can only be executed on the Master processor 32. The IODONE function is called by the IODONE Handler Dispatch 26.

The operating system kernel timer handler dispatch 18, does not have provisions for directing device driver execution. The timer function is always invoked on the same CPU that the timer was started on. In the case of a uniprocessor device driver, its code execution, due to the results of the present invention, is guaranteed to only be on the Master processor 32. Therefore, any timers started by a uni-processor device driver will have been started on the master processor and subsequently, the execution of the timer handler would also be on the master processor. Multiprocessor device drivers can be executing on any processor, thus starting and handling timers on any processor.

Figure 2A:
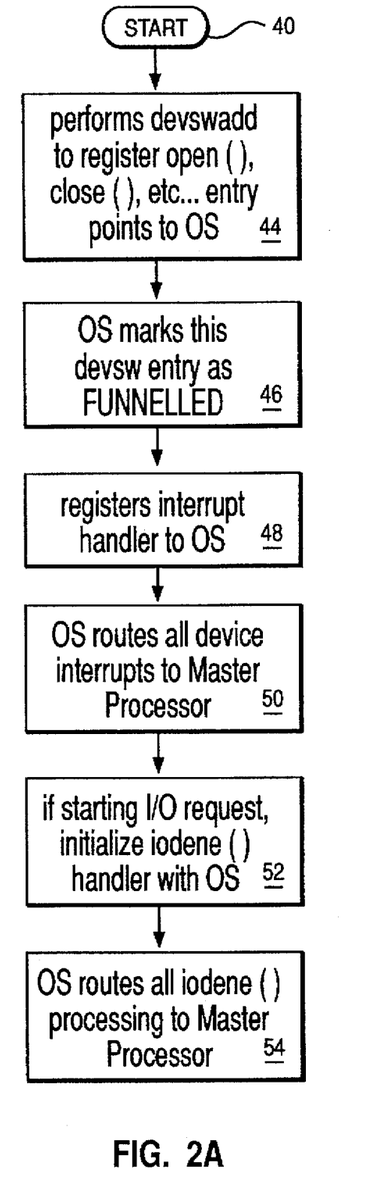
FIG. 2 is a flow diagram for device driver initialization on multiprocessor platform.
Figure 2B:
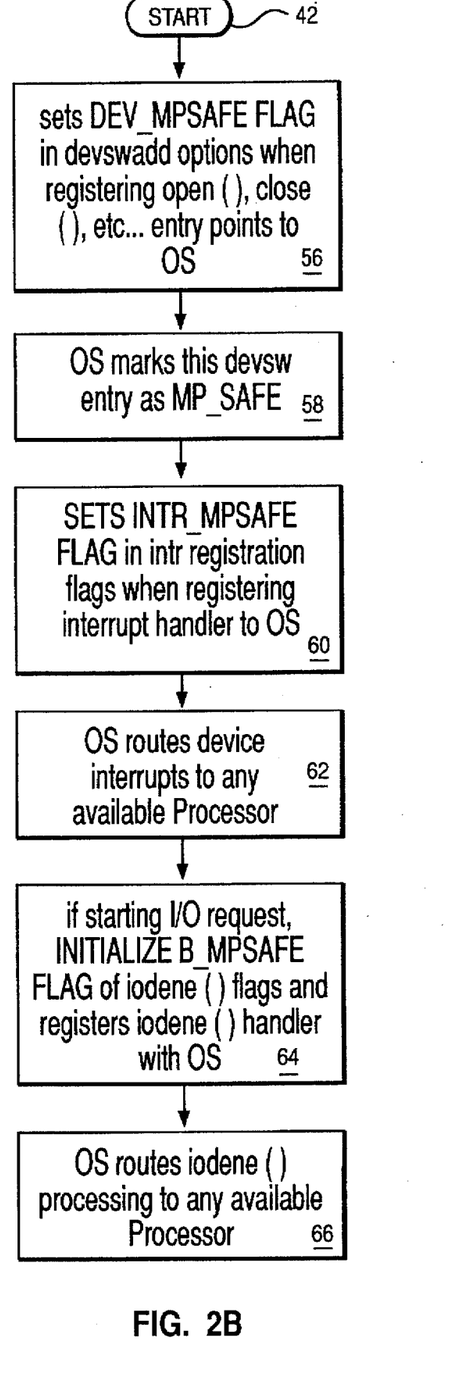
Figure 6:
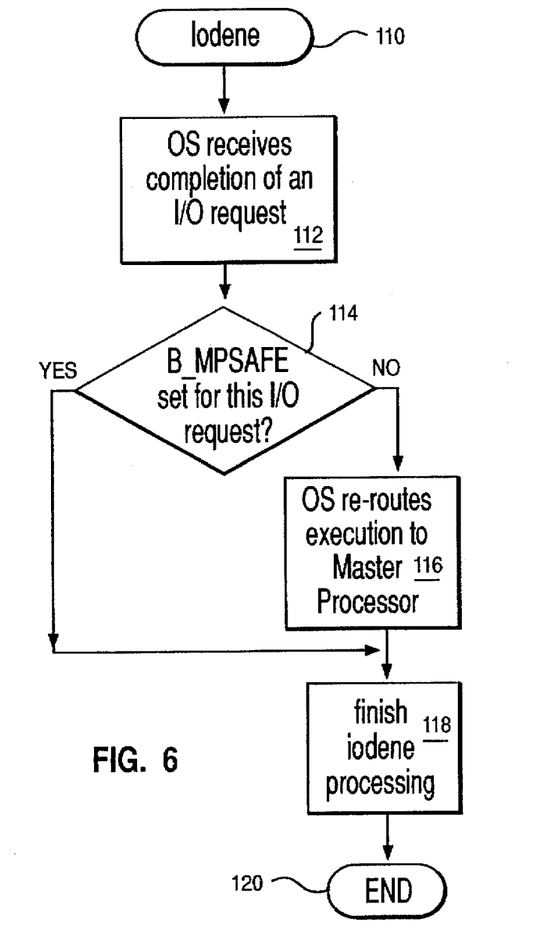
FIG. 6 is a flow diagram of device driver invocation through the IODONE ( ) handler.

Turning now to FIG. 2, there is shown a flow diagram for device driver initialization using the invention. The procedure for initialization of a uniprocessor, non MP Safe device driver, starts at block 40. Here, the procedure uses the devswadd service to register the device driver's open(), close(), read(), write(), ioctl(), strategy(), select(), config(), print(), dump(), mpx(), and revoke() entry points with the operating system, in a manner known in the art. The details of each entry point is not relevant to the invention, except the fact that these entry points are invoked by the operating system on behalf of an application or other kernel extension or device driver for the propose of performing I/O, or other requests to a device. In block 46, the operating system sees that the DEV_MPSAFE flag is not set during registration and marks the device entry to be funneled. This means that all accesses to this device through the device switch table will be executed on the Master processor 32. At block 48, the device driver registers an interrupt handler to the operating system to be called when the operating system receives an external interrupt on behalf of this device. The operating system sees that the INTR_MPSAFE flag is not set during the interrupt handler registration and routes all device interrupts for this device to the Master processor 32. If the device driver initiated an I/O request as depicted in block 52, the operating system will call the initiator's IODONE() handler upon completion of the I/O request. In block 54, the operating system sees that the B_MPSAFE flag for this I/O request is not set and will reroute execution of this IODONE() handler to the master processor. Moving to block 42, the procedure for initialization of a multiprocessor enabled device driver is shown, In block 56, the multiprocessor enabled device driver sets the DEV_MPSAFE flag and allows all accesses to this device driver's entry points to execute on any processor. When the multiprocessor enabled device driver registers an interrupt handler to the operating system, as in block 60, it sets the INTR_MPSAFE flag, which when noticed by the operating system in block 62, allows routing of it s device interrupts to any available processor. If the multiprocessor enabled device driver initiates an I/O request as in block 64, it sets the B_MPSAFE flag of the I/O request information block to indicate that the IODONE() handler for this request can be executed on any available processor.

and length of the buffer in system memory to transfer data to or from, the I/O device and offset of the device to transfer data to or from, the IODONE() function to invoke when the I/O is complete, flags indicating the direction of the transfer (B_READ, B_WRITE) and whether the IODONE() handler is MP Safe (B_MPSAFE), as well as other relevant information. If the operating system determines that the IODONE() handler is not MP Safe, due to the absence of the B_MPSAFE flag in the I/O request information block, the

TABLE A

| DEVSW | Device type | DEVSW Flags | Interrupt Flags | Buffer Flags on Sample Read |
|---|---|---|---|---|
| 0 | NVRAM | DEV_DEFINED | <no interrupt> | B_READ |
| 1 | <empty> | DEV_NOT_DEFINED | <no interrupt> | <not_applicable> |
| 2 | SCSI Adapter | DEV_DEFINED DEV_MPSAFE | INTR_LEVEL INTR_MPSAFE | B_READ B_MPSAFE |
| 3 | Floppy Diskette | DEV_DEFINED | INTR_EDGE | B_READ |
| 4 | Ethernet Adapter | DEV_DEFINED DEV_MPSAFE | INTR_LEVEL INTR_MPSAFE | B_READ B_MPSAFE |
| . | ..... | ...... | ...... | ...... |
| . | ..... | ...... | ...... | ...... |

Figure 3:
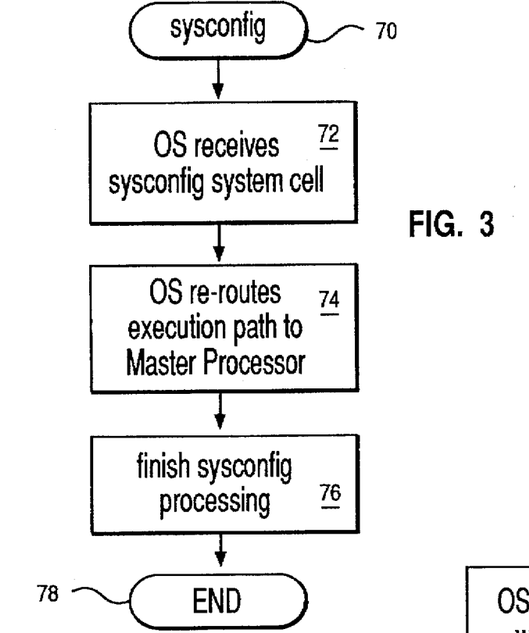
FIG. 3 is a flow diagram for the invocation of a device driver through the config entry point.
Figure 4:
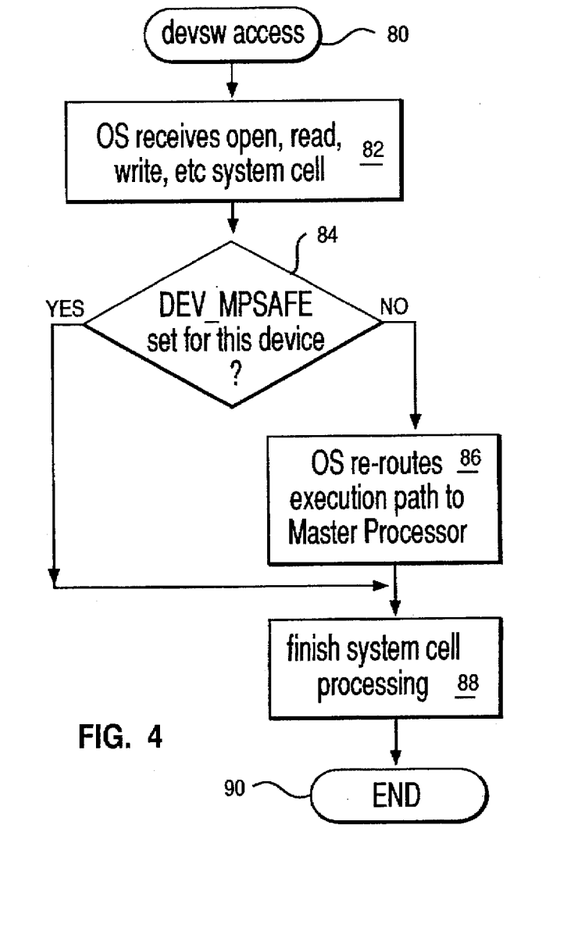
FIG. 4 flow diagram for the invocation of device drivers through the device switch table entry point.

With reference to FIG. 3, there is shown a flow diagram using the config entry point. The procedure began at block 70 and proceeds to block 72, where the operating system receives the system configuration system call. At block 74, the operating system routes the execution path to the master processor. System configuration processing is finished at block 76 and the procedure ends at block 78, Turning now to FIG. 4, a flow diagram is shown for invocation of a device driver switch table entry point via operating system calls such as open(), close(), read(), write (), or other similar operating system interfaces. The procedure starts at block 80 where the devsw service is accessed using one of the system calls. At block 82, the operating system receives the open, read, write, etc. system call. At block 84, the procedure checks to see if the selected device driver is MP_SAFE. If NO, at block 86, the procedure causes the operating system to reroute execution of the selected device driver to the master processor. Returning to block 84, if the device driver is MP_SAFE, processing continues at block 88 where the procedure finishes system call processing on the current processor and the procedure ends at block 90.

Figure 5:
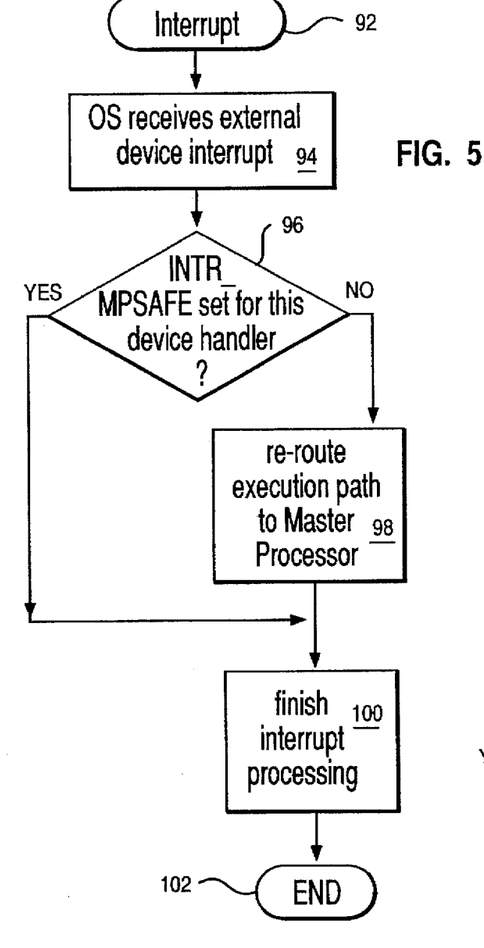
FIG. 5 is a flow diagram for invocation of device drivers through the interrupt handler.

Turning now to FIG. 5, a flow diagram is shown for invocation of the device driver using the interrupt handler. Processing starts at block 92 where an interrupt is detected. At block 94, the operating system receives the external device interrupt. The interrupt request is then checked to determine if the interrupt is MP_SAFE. If YES, processing proceeds to block 100. Else, at block 98, the procedure reroutes execution of the device driver to the master processor. At block 100, the procedure finishes interrupt processing on any available processor and terminates at block 102.

With reference to FIG. 6, a flow diagram is shown for invocation of a device driver's IODONE handler. An IODONE() handler is provided by the initiator of an I/O request, and is invoked by the operating system upon completion of the I/O request. Processing starts at block 112, where the operating system receives completion of an I/O request. Each I/O request is described by an I/O request information block. This information block contains necessary information about the I/O request including the address operating system reroutes execution of the IODONE() handler to be on the Master processor 32, as shown in block 116. Other wise, if in block 114, the operating system detects that the IODONE() handler is MP Safe due to the presence of the B_MPSAFE flag, it allows execution of the IODONE() handler on any available processor.

Figure 7:
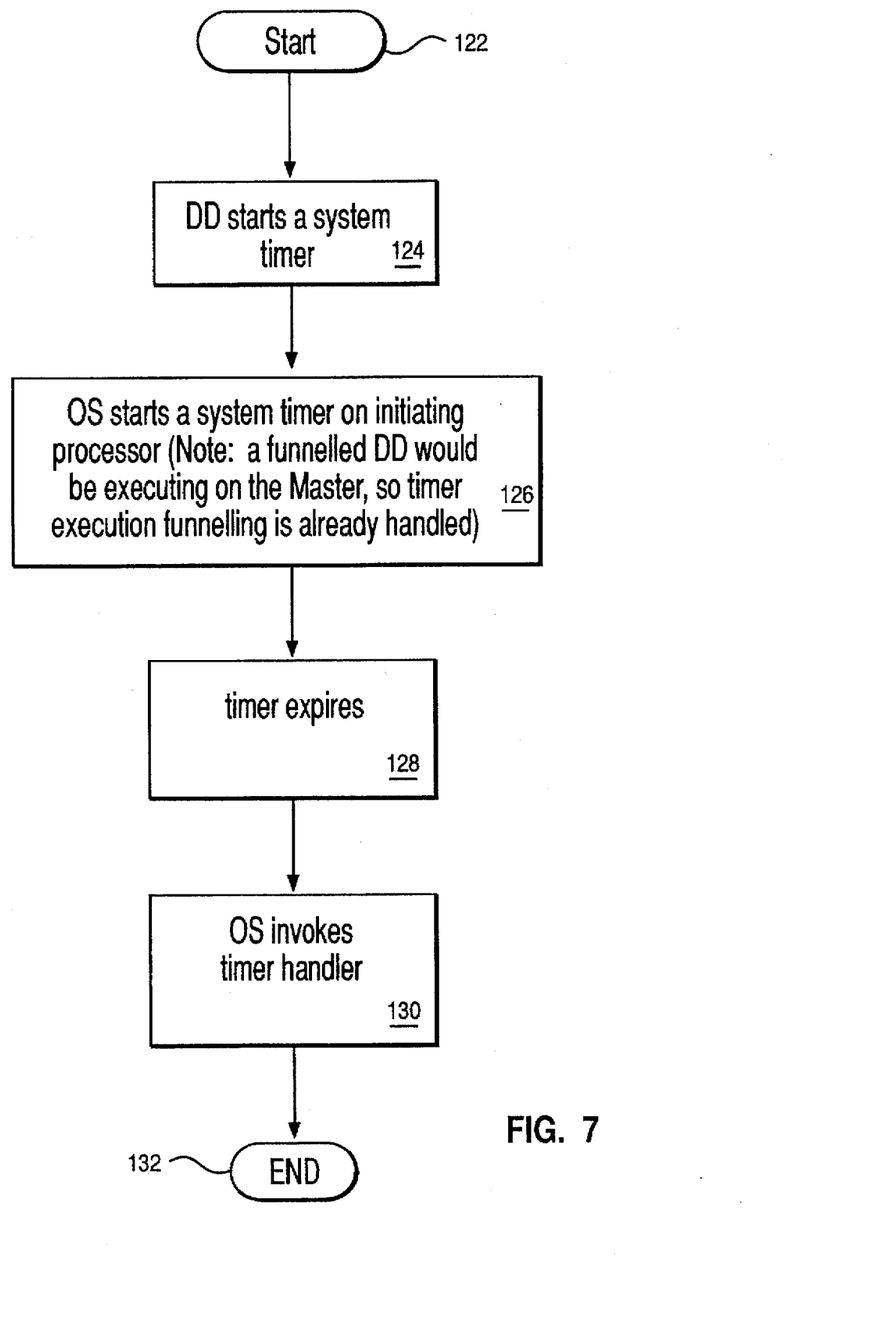
FIG. 7 is a flow diagram for device driver invocation through the timer handler.

Turning now to FIG. 7, a flow diagram is shown for invocation of device drivers timer handler. The procedure starts at block 122 and proceeds to block 124 where the device driver starts a system timer. At block 126, the operating system starts a system timer on the currently executing processor. Note that a funnelled device driver would be executing on the master so therefore timer execution funneling is already handled since the timer execution of the timer handler will be on the same processor that started the timer. The timer expires at block 128 and the operating system invokes the timer handler at block 130. The procedure ends at block 132.

Figure 8:
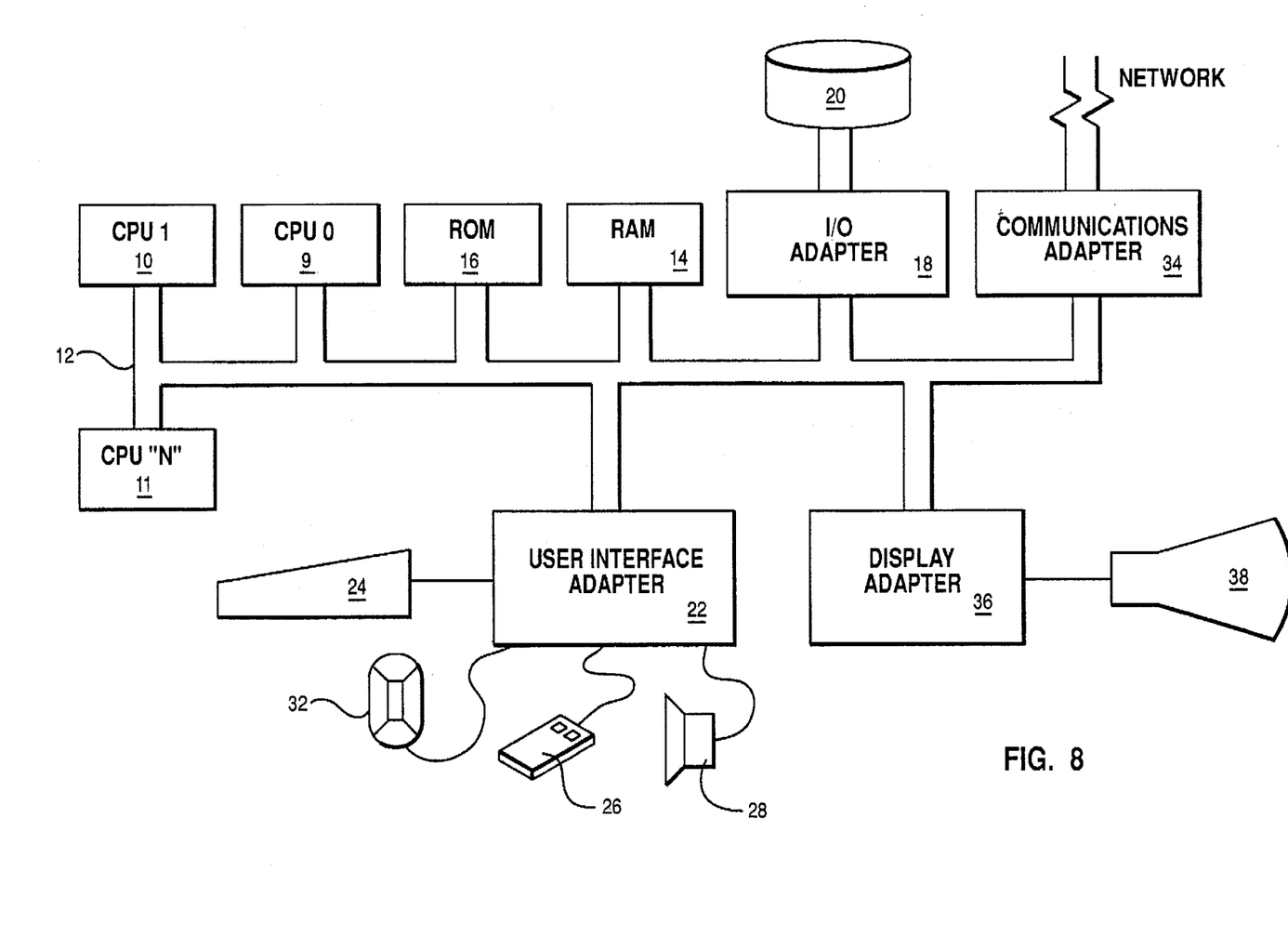
FIG. 8 is a block diagram of a workstation for practicing the invention.

Turning to FIG. 8, the invention is preferably practiced in the context of an operating system resident on an IBM computer/workstation (e.g., RS/6000 or PS/2 manufactured by the IBM Corporation). A representative hardware environment is depicted in FIG. 8, which illustrates a typical hardware configuration of a workstation in accordance with the subject invention having multiple central processing units 9, 10, and 11, such as conventional microprocessors, and a number of other units interconnected via a system bus 12. The workstation shown in FIG. 8 includes a Random Access Memory (RAM) 14, Read Only Memory (ROM) 16, an I/O adapter 18 for connecting peripheral devices such as disk unit 20, capable of receiving computer readable medium to the bus, a user interface adapter 22 for connecting a keyboard 24, a mouse 26, a speaker 28, a microphone 32, and/or other user interface devices such as a touch screen device (not shown) to the bus, a communication adapter 34 for connecting the workstation to a data processing network and a display adapter 36 for connecting the bus to a display device 38. The workstation has resident thereon the AIX operating system or an equivalent operating system executing on an SMP platform.

While the invention has been described with respect to a preferred embodiment thereof, it will be understood by those skilled in the art that various changes in detail may be made therein without departing from the spirit, scope, and teaching of the invention. Accordingly, the herein disclosed invention is to be limited only as specified in the following claims.

What we claim is:

1. A method for executing device drivers on a multiprocessor platform having a plurality of processors including a master processor, wherein said device drivers were created for execution on a uniprocessor platform, comprising:

receiving an interrupt for a selected one of said device drivers into said multiprocessor platform;

determining if the selected one of said device drivers is created for execution on said uniprocessor platform by the presence or absence of a flag on said selected one of said device drivers;

executing the selected one of said device drivers only on said master processor of said multiprocessor platform when the selected one of said device drivers is determined to be created for said uniprocessor platform; and executing said device drivers on any one of said plurality of processors in said multiprocessor platform when not created for said uniprocessor platform.

2. The method of claim 1 wherein said step for receiving said device drivers include an operating system on said multiprocessor platform.

3. The method of claim 1 wherein said step for determining includes a step for registering said device drivers in said operating system based on a user supplied flag.

4. The method of claim 3 wherein said step for registering includes a step for posting a MP_SAFE flag for device drivers not created for said uniprocessor platform.

5. An apparatus for executing device drivers on a multiprocessor platform having a plurality of processors including a master processor, wherein said device drivers were created for execution on a uniprocessor platform, comprising:

means for receiving an interrupt for a selected one of said device drivers into said multiprocessor platform;

means for determining if the selected one of said device drivers is created for execution on said uniprocessor platform by the presence or absence of a flag on said selected one of said device drivers;

means for executing the selected one of said device drivers only on said master processor of said multiprocessor platform when the selected one of said device drivers is determined to be created for said uniprocessor platform; and means for executing said device drivers on any one of said plurality of processors in said multiprocessor platform when not created for said uniprocessor platform.

6. The apparatus of claim 5 wherein said means for receiving said device drivers include an operating system on said multiprocessor platform.

7. The apparatus of claim 5 wherein said means for determining includes a means for registering said device drivers in said operating system based on a user supplied flag.

8. The apparatus of claim 7 wherein said means for registering includes means for posting a MP_SAFE flag for device drivers not created for said uniprocessor platform.

9. A computer program product having a computer readable medium having computer program logic recorded thereon for executing device drivers on a multiprocessor platform having a plurality of processors including a master processor, wherein said device drivers were created for execution on a uniprocessor platform, comprising:

computer readable medium means for receiving an interrupt for a selected one of said device drivers into said multiprocessor platform;

computer readable medium means for determining if the selected one of said device drivers is created for execution on said uniprocessor platform by the presence or absence of a flag on said selected one of said device drivers;

computer readable medium means for executing the selected one of said device drivers on said master processor of said multiprocessor platform when the selected one of said device drivers is determined to be created for said uniprocessor platform; and computer readable medium means for executing said device drivers on any one of said plurality of processors in said multiprocessor platform when not created for said uniprocessor platform.

10. The computer program product of claim 9 wherein said computer readable medium means for receiving said device drivers include an operating system on said multiprocessor platform.

11. The computer program product of claim 9 wherein said computer readable medium means for determining includes a means for registering said device drivers in said operating system based on a user supplied flag.

12. The computer program product of claim 9 wherein said computer readable medium means for registering includes means for posting a MP_SAFE flag for device drivers not created for said uniprocessor platform.

* * * * *